(12) United States Patent
Zambon

(10) Patent No.: US 7,446,862 B2
(45) Date of Patent: *Nov. 4, 2008

(54) DOOR SENSOR SYSTEM FOR DETECTING A TARGET OBJECT

(75) Inventor: Alain Zambon, Saint-Nicolas (BE)

(73) Assignee: B.E.A.s.a., Angleur (BE)

( * ) Notice: Subject to any disclaimer, the term of this patent is extended or adjusted under 35 U.S.C. 154(b) by 0 days.

This patent is subject to a terminal disclaimer.

(21) Appl. No.: 11/834,646

(22) Filed: Aug. 6, 2007

(65) Prior Publication Data

US 2008/0007710 A1   Jan. 10, 2008

Related U.S. Application Data

(63) Continuation of application No. 11/186,555, filed on Jul. 21, 2005, now Pat. No. 7,349,074.

(30) Foreign Application Priority Data

Jul. 22, 2004   (EP)   ................ 04017301.5

(51) Int. Cl.
  *G01C 3/08*   (2006.01)
(52) U.S. Cl. ................ 356/5.01; 356/4.01; 356/4.1; 356/5.15
(58) Field of Classification Search ....... 356/3.01–3.15, 356/4.01–4.1, 5.01–5.15, 6–22
  See application file for complete search history.

(56) References Cited

U.S. PATENT DOCUMENTS

| 4,794,248 A | 12/1988 | Gray |
| 4,864,296 A | 9/1989 | Trett |
| 4,888,532 A | 12/1989 | Josson |
| 5,142,152 A | 8/1992 | Boiucaner |
| 5,291,262 A | 3/1994 | Dunne |
| 5,420,430 A | 5/1995 | Trett |
| 5,604,580 A | 2/1997 | Uehara |
| 5,689,235 A | 11/1997 | Sugimoto et al. |
| 5,691,725 A | 11/1997 | Tanaka |
| 5,739,523 A | 4/1998 | Tsutsumi et al. |

(Continued)

FOREIGN PATENT DOCUMENTS

DE   102 03 145 C1   4/2003

(Continued)

OTHER PUBLICATIONS

Kaisto I et al: "Laser rangefinding techniques in the sensing of 3-D objects" Proceedings of the SPIE—the International Society for Optical Engineering USA, vol. 1260, 1990, pp. 122-133, XP002445596 ISSN: 0277-786X.

*Primary Examiner*—Thomas H Tarcza
*Assistant Examiner*—Luke D Ratcliffe
(74) *Attorney, Agent, or Firm*—Woodling, Krost and Rust

(57) ABSTRACT

A door sensor system (90) for detecting a target object (56) in and/or near a door comprising a door opening (96), and at least one movable door element (76, 76-1, 76-2, 76-3, 76-4), the system comprising at least one light scanner device (10) which is capable of measuring optically the distance to a target to make such a measurement over a given scan angle at regular intervals by deflecting the light with moving mirrors, and which generates at least one vertical plane of detection.

18 Claims, 8 Drawing Sheets

U.S. PATENT DOCUMENTS

Figure 1A:
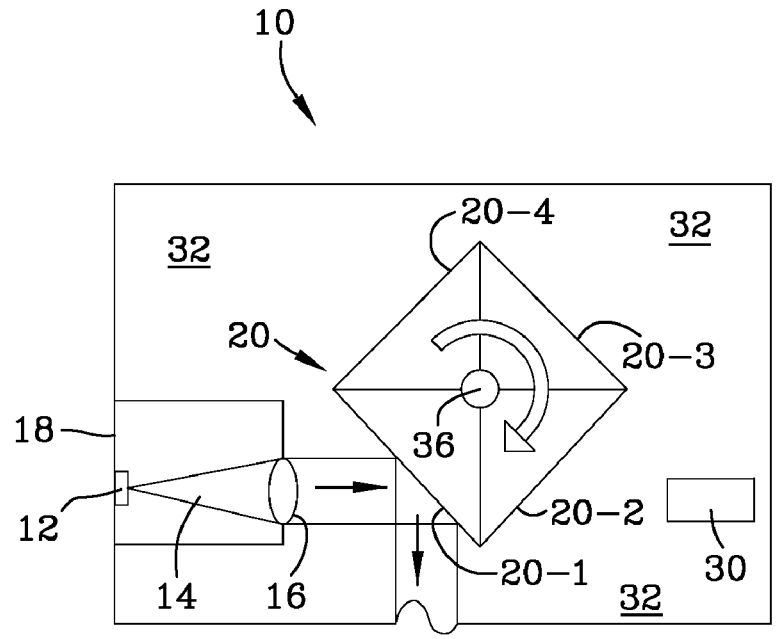

| | | |
|---|---|---|
| 5,889,479 A | 3/1999 | Tabel |
| 5,910,767 A * | 6/1999 | Frucht ........................ 340/557 |
| 5,949,530 A | 9/1999 | Wetteborn |
| 6,080,981 A | 6/2000 | Payne |
| 6,160,479 A | 12/2000 | Åhlen et al. |
| 6,330,523 B1 | 12/2001 | Kacyra |
| 6,552,345 B2 | 4/2003 | Asano et al. |
| 7,183,912 B2 | 2/2007 | Micko |
| 2001/0012016 A1 | 8/2001 | Eiichi et al. |
| 2002/0003617 A1* | 1/2002 | Doemens et al. ........... 356/4.01 |
| 2002/0008876 A1 | 1/2002 | Terui et al. |
| 2002/0018198 A1 | 2/2002 | Pierenkemper |
| 2002/0196424 A1 | 12/2002 | Sano et al. |
| 2003/0123045 A1 | 7/2003 | Riegl et al. |
| 2004/0036851 A1 | 2/2004 | Hunter et al. |
| 2004/0233414 A1* | 11/2004 | Jamieson et al. ........... 356/4.01 |
| 2006/0087430 A1 | 4/2006 | Zambon |
| 2006/0169876 A1 | 8/2006 | Zambon |

FOREIGN PATENT DOCUMENTS

| | | |
|---|---|---|
| EP | 0 300 663 A2 | 1/1989 |
| EP | 0 689 033 A1 | 12/1995 |
| EP | 1 016 850 A2 | 7/2000 |
| EP | ESR 04 01 7301 | 2/2005 |
| EP | ESR 04 01 7301 | 4/2005 |
| EP | 07110717 SR | 8/2007 |
| GB | 2374 228 A | 10/2002 |
| JP | 05060994 | 3/1993 |
| JP | 11 109035 A | 4/1999 |
| JP | 2000028722 | 1/2000 |
| WO | WO 83/01855 | 5/1983 |
| WO | WO 03/019067 A | 3/2003 |

* cited by examiner

DOOR SENSOR SYSTEM FOR DETECTING A TARGET OBJECT

This application is a continuation of Ser. No. 11/186,555 filed on Jul. 21, 2005 now U.S. Pat. No. 7,349,074 and claims priority thereto. application Ser. No. 11/186,555 claims priority to European Patent Application No. 04 017301.5 which was filed on Jul. 22, 2004.

The present invention relates generally to a door sensor system for detecting a target object in and/or near a door.

Active sensor devices used for presence or motion detection generally rely on the principle that the device comprises an emitter that emits radiation—typically electromagnetic radiation such as light or microwave in the direction of an area, for example on the ground or there above, or a solid angle in space to be surveyed, herein referred to as a surveillance area, and a radiation detector for detecting a portion of the radiation re-emerging from the surveillance area for example based on its reflectivity. The amount of re-emerging radiation varies, when the reflectivity in the direction of the radiation detector is altered. This may occur for example as a consequence of an object entering the surveillance area.

US 2002/0018198 A1 relates to a method for distance measurement and a distance measuring device, wherein a rotating polygonal mirror wheel is used to generate a scan during which an object is swept over by a scan line. At least a part of an emitted light signal is received as a reference light signal by a receiver without reflection at an object and is converted into a reference signal. The distance of an object is measured by determining the light transit time. The light transit time is evaluated by determining the phase shift between the reflection signal and the reference signal.

US 2002/0008876 A1 relates to a stray light barrier structure of reflection measuring apparatus, wherein a laser light beam is emitted via a lens to a planar mirror and subsequently through a beam exit opening in a partition wall towards a rotating polygonal mirror.

The usage of rotating mirrors for influencing the trajectory of light beams is also known from EP 0 300 663 A1 and JP 05 060994 A.

Furthermore, optical devices and systems based on the measurement of the reflection of sent out light beams or pulses are disclosed in EP 1 016 850 A2, EP 0 689 033 A1, US 2002/0196424 A1, U.S. Pat. No. 4,864,296, and JP 2000 028722 A.

The present invention relates to a door sensor system. Such a system can include a transmitter comprising a pulsed light source, a receiver comprising a photodetector, and a deflection means, for example a rotating mirror, adapted to sweep a beam of transmitted light pulses across a sweep sector so as to cover the surveillance area. By using such a beam sweeping means, it is possible to scan one or several lines in a scanned area to provide a complete profile along the line or lines of distances to reflecting targets located on the scanned line or lines. Detection of a target is based on a time-of-flight (TOF) measurement of light pulses transmitted toward the scanned area and reflected back to the receiver. The time of flight is evaluated and the distance deducted based on the known speed of light. By comparing the distance obtained in the absence of a target object and when a target object is present within the surveillance area, reliable presence detection can be obtained. By comparing distance profiles obtained at different instances where a moving target object is in the surveillance area, the speed of movement: of the target along the scanned line or lines can be deduced as well.

Presence detection based on TOF measurement has several advantages. Since measurements are made as distance measurements, they are independent of the reflectivity, for example of the ground, in the surveillance area. As such, the measurements are also independent from changes of the reflectivity that may be caused for example by environmental changes in the surveillance area, for example of the ground reflectivity due to rain, snow or small loose objects such as leaves. When a pulsed laser is used as pulsed light source, very accurate lines of detection can be obtained, avoiding any interference from stationary objects that may be pre-sent in the surveillance area in contrast to what may be expected when using less focusing sensor devices. With a view to an application as a door sensor, the accurate lines of detection may be adjusted to cover for example the maximum surface of the door opening so as to avoid interference from the moving door element.

The laser scanning technique is known in the art, see for example U.S. Pat. Nos. 5,949,530; 5,604,580 and 5,291,262. According sensor types comprise basically a distance measurement head and a deflection system. Light based TOF distance measurement involves short-time pulses and high repetition rates, allowing to obtain mean values over several samples (sweeps) to achieve low noise, and very rapid acquisitions over the trajectory of the beam to and from the site of reflection from a target object.

Deflection systems use several types of techniques, many of them comprising mirrors. A mirror may be placed on a motor-driven axis and rotated continuously. The position of the mirror must be synchronized with a processing unit in order to get reliable results from one sweep along a sweep line to another.

When used in outside or outdoor applications, sensor systems would normally be accommodated in a casing for protection against harsh environmental conditions influencing the trajectory of light, such as for example rain and dust. A sensor in a casing that is subject to harsh conditions, such as rain or dust, would suffer from heavy reflections at a transmitting front cover or along the trajectory of the light pulses. Another problem is aging, which could degrade the reflection and/or transmission characteristics of the mirror and/or the front cover. Such effects lead to strong reflection at the receiver, which may prevent the sensor device from working properly over an extended period of time.

It is therefore an object of the present invention to provide a door sensor system, which avoids the above mentioned disadvantages and ensures a good reliability over a long term of use.

According to a first aspect of the present invention, the above objects are achieved by a door sensor system for detecting a target object in and/or near a door comprising a door opening and at least one movable door element. The system comprises at least one light scanner device capable of measuring optically the distance to a target to make such a measurement over a given scan angle at regular intervals by deflecting the light with moving mirrors. For example, the scanner device can be optimized for a usage on top of a door frame at three different specified locations in order to reliably detect the presence of object in the vicinity of a door. The door sensor system generates at least one vertical plane of detection.

In the application of the light scanner device as a door sensor system, it is not necessary to provide measurement accuracy similar to the high accuracy achieved in conventional telemeter systems, which is in the range of centimeters to millimeters. Such high accuracy is not required in door safety applications, where the target objects to be detected are generally of a considerable larger size. This leads to relaxed specifications for the measurement system and allows providing simpler and lower cost systems fulfilling the requirements of this application.

The door sensor system may be adapted such that the variable sweep directions cover a scanned area extending substantially horizontally near the door opening and near the door elements and at a predetermined height above or on a ground.

According to a further embodiment the light scanner device has an adjustable scanning area wherein targets generate detection. The width and height of the scanning area can be adjusted according to the dimensions of the door.

In one embodiment, the door sensor system comprises at least one light scanner device associated with the door opening to survey the door opening. This is for example when used on sliding or sectional doors.

According to a further aspect of the invention a door sensor system for door with movable elements, e.g., swinging door, is provided which comprises at least one light scanner device associated with one of the movable door elements. More preferably, when used on revolving doors, the system comprises at least one light scanner device associated with each movable door element. It is mostly preferred that the at least one light scanner device is the device described above.

The scanned area may have a scanning length that is directed substantially parallel to the door element.

Preferably, the scanning length can be dynamically varied to extend along and not project beyond the door element when the door element is between door frame elements and to project beyond the door element when the door element is not between said door frame elements.

According to a further embodiment of the invention the light scanner device transmits and receives non-visible light pulses, and the door sensor system further comprises an illumination means adapted to emit visible light so as to visibly illuminate the scanned area in order to ease its positioning during installation.

Especially, the system further comprises adjustment means for adjusting the orientation of the door sensor device such that a position of the scanned area can be aligned with respect to the door elements.

More preferably, the adjustment means comprises a screw adapted to adjust the tilt angle of the sweep sector. Preferably also, the system comprises a mounting bracket means adapted such that the system can be mounted to a door frame element in at least three different angular positions with corresponding at least three different orientation angles of the sweep sector. This enables to conveniently install the door sensor system in a door frame at least on a top aside of the door opening or on a top middle portion above a door opening.

The door sensor system is provided with a light scanner device for measuring a range and an angular direction of a target object. The device comprises a pulse source adapted to transmit light pulses, a transmitter deflection means adapted to sweep the transmitted light pulses in variable sweep directions across a sweep sector, a photodetection means adapted to detect received light pulses that have been reflected in the sweep sector, a receiver deflection means adapted to re-direct light pulses that have been reflected in the sweep plane to the photodetection means.

The device further comprises optical shielding means adapted to optically shield transmitted light pulses on their trajectory from the pulse source to the transmitter deflection means and at least a portion of their trajectory extending from the transmitter deflection means into the sweep sector from reflected light pulses on their trajectory between the photodetection means and the receiver deflection means and at least a portion of their trajectory extending in the sweep sector and ending on the receiver deflection means. The optical shielding means reduces or avoids that reflections or stray light ("cross talk") of transmitted light pulses generated in or near the device reach the photodetector.

Such a device is suited for an external use, particularly because of the "splitted" light transmit and receive paths which make the device less sensitive to reflections on a front plate compared to known sensor devices.

Advantageously, the sweep sector is comprised in a sweep plane.

Preferably, the device further comprises a casing adapted to accommodate at least the pulse source, the transmitter deflection means, the receiver deflection means, the photodetection means and the optical shielding means, whereby the optical shielding means shields transmitted pulses from received pulses on at least their whole trajectory portions located within the casing. The casing protects the elements of the device from being covered by dust and dirt present in the environment.

Preferably, the transmitter deflection means comprises a first multi-facet mirror comprising a plurality of at least one facet adapted to rotate around a rotation axis. The first multi-facet mirror may comprise between 1 and 8 facets.

More preferably, the receiver deflection means comprises a second multi-facet mirror comprising a plurality of at least one facet and adapted to rotate in synchronism with the variable sweep directions.

Still more preferably, the transmitter deflection means and the receiver deflection means both comprise a multi-facet mirror comprising a plurality of at least one facet that is/are substantially parallel to each other, and wherein the multi-facet mirror of the transmitter deflection means and the multi-facet mirror of the receiver deflection means are adapted to be rotated in synchronism with each other on a common rotation axis.

Advantageously, the multi-facet mirror of the transmitter deflection means and the multi-facet mirror of the receiver deflection means form a split multi-facet mirror comprising a groove adapted to optically separate the multi-facet mirror of the transmitter deflection means and the multi-facet mirror of the receiver deflection means. The groove serves to shield stray light traveling within the mirror means.

Preferably, to achieve most effective shielding, the optical shielding means extends into a groove between the multi-facet mirror of the transmitter deflection means and the multi-facet mirror of the receiver deflection means.

Alternatively, the receiver deflection means comprises a stationary mirror adapted to receive light pulses reflected in the sweep plane. Preferably, the receiver deflection means then comprises a planar, spherical or cylindrical mirror portion.

Preferably, the pulse source is a pulsed laser or a pulsed laser diode.

Preferably, the photodetection means comprises a high speed, high gain photodetector such as an avalanche photodiode, to obtain a good sensitivity of the receiver.

Advantageously, the transmitted mirror elements and the receiver mirror elements are adapted such that a tilt angle of the sweep sector is variable. Preferably, the tilt angle of the sweep sector is variable between subsequent sweeps by an incremental tilt angle. This allows covering an area having a greater width than a diameter of a beam of the transmitted light pulses swept in the sweep sector.

Preferably, a detection range is variably controllable. The controllability may be achieved, for example, by an electronic windowing technique. Controllability of the detection range allows the "filtering out" of signals from objects that are very far away, for example outside a surveillance range when the surveillance area is in fact a limited solid angle in space rather than a surface for example on the ground, or when the surveillance area is a limited portion of surface on the ground and the scanner device transmits light pulses downward toward the ground, the filtering out of objects lying on the ground that are less tall than target objects to be detected.

Preferably, the light pulses transmitted from the pulse source form a beam that is substantially parallel to a beam formed by light pulses that have been reflected in the sweep sector and that have been re-directed by the receiver mirror means to the photodetection means. In such configuration, the optical assembly comprising the pulse source, the transmitter and receiver mirror means and the receiver does not require additional optical elements for keeping transmit and receive paths coaxial, the field of view of the photodetector can easily be aligned to cover the sweep line swept by the transmitted light beam.

Preferably, the device further comprises a transmitter lens adapted to form transmitted light pulses into a transmitted beam. Preferably also, the device comprising a receiver lens adapted to focus to the photodetection means a received beam of light pulses that have been re-directed by the receiver mirror means. Such assembly also allows reducing the size and manufacturing cost of the scanner device.

Advantageously, the device further comprises a reflector means adapted to reflect transmitted pulses onto the photodetection means at instances when the transmitted pulses are not re-directed into the sweep sector by the transmitter mirror means, so as to allow calibrating a minimum detection range as a reference for the light scanner device. Preferably, the reflector means is a retro-reflector or a light pipe adapted to reverse a traveling direction of the pulses transmitted by the pulse source. Internal optical feed-back of transmitted light pulses can be used as a reference signal and for calibrating the systematic errors of the measurement device.

Further advantages and possible applications of the present invention become apparent from the following detailed description with reference to the exemplifying embodiments illustrated by way of example in the drawings.

Figure 1B:
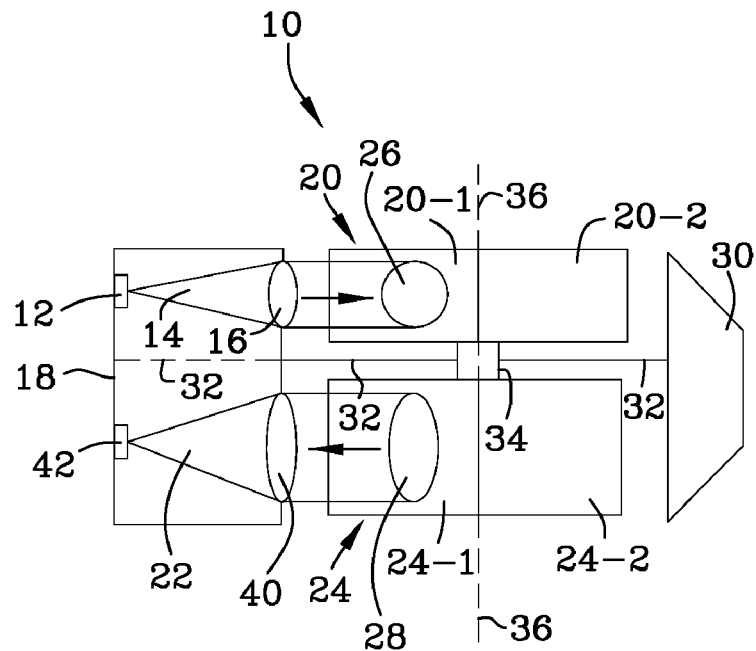
Figure 2A:
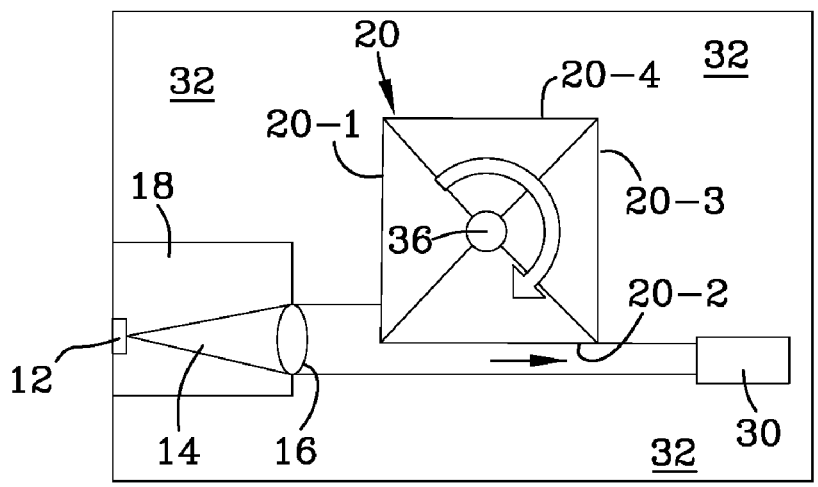
Figure 2B:
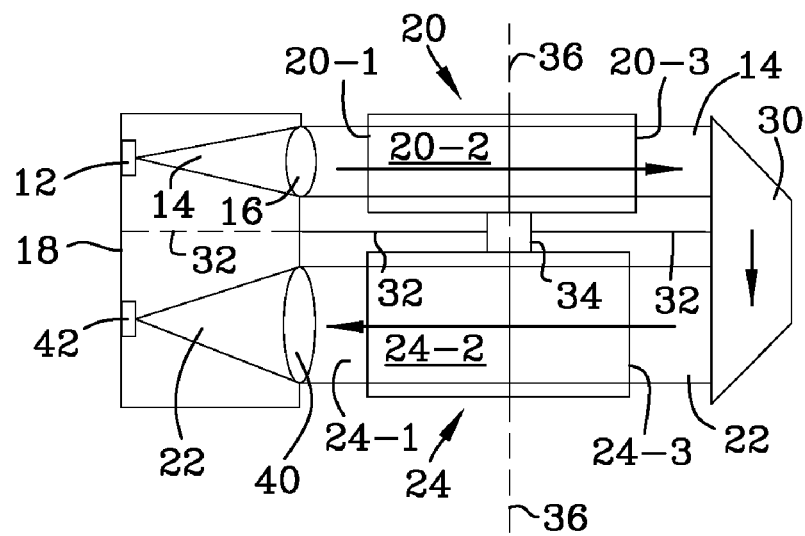
Figure 3:
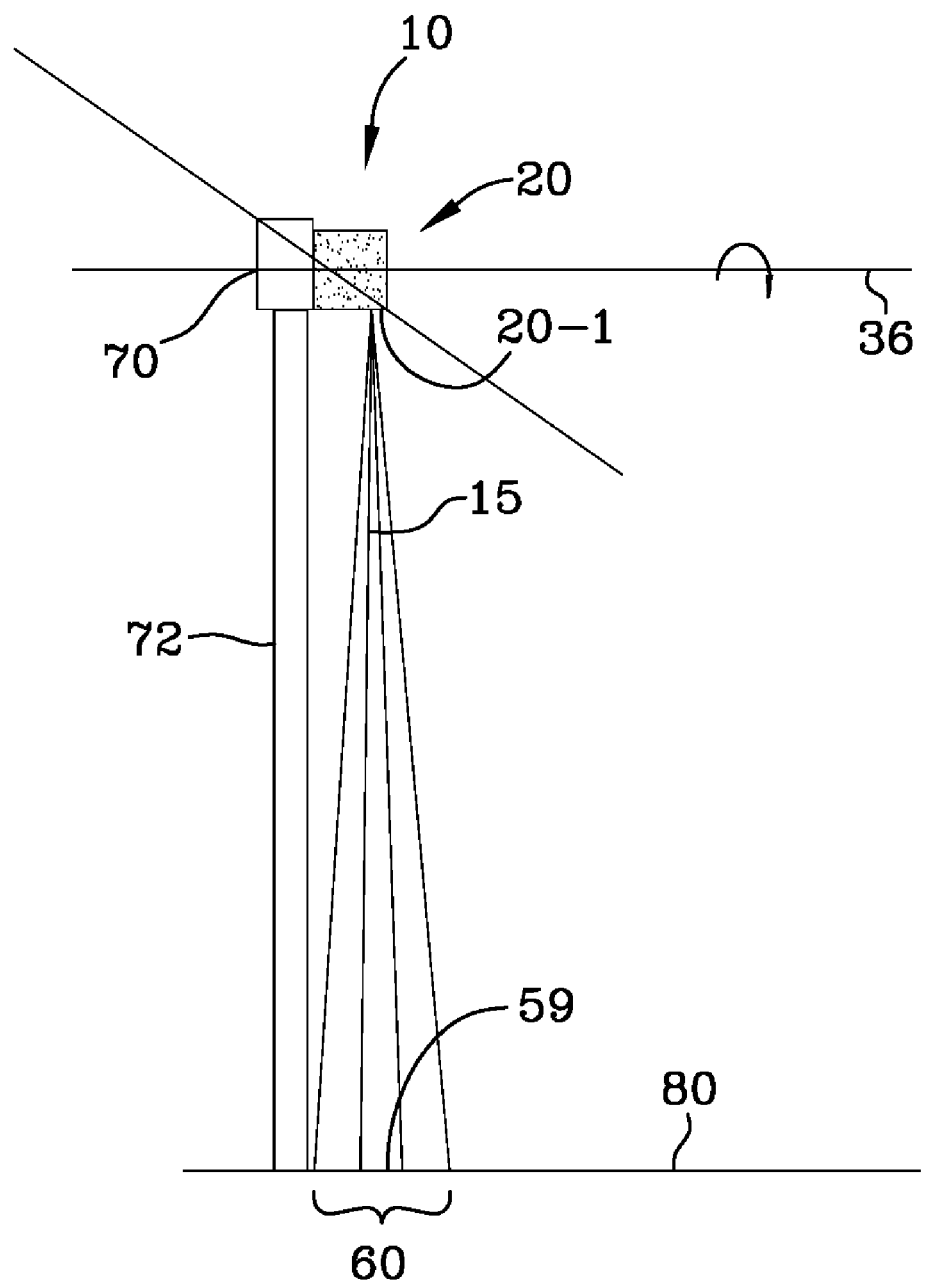
Figure 4:
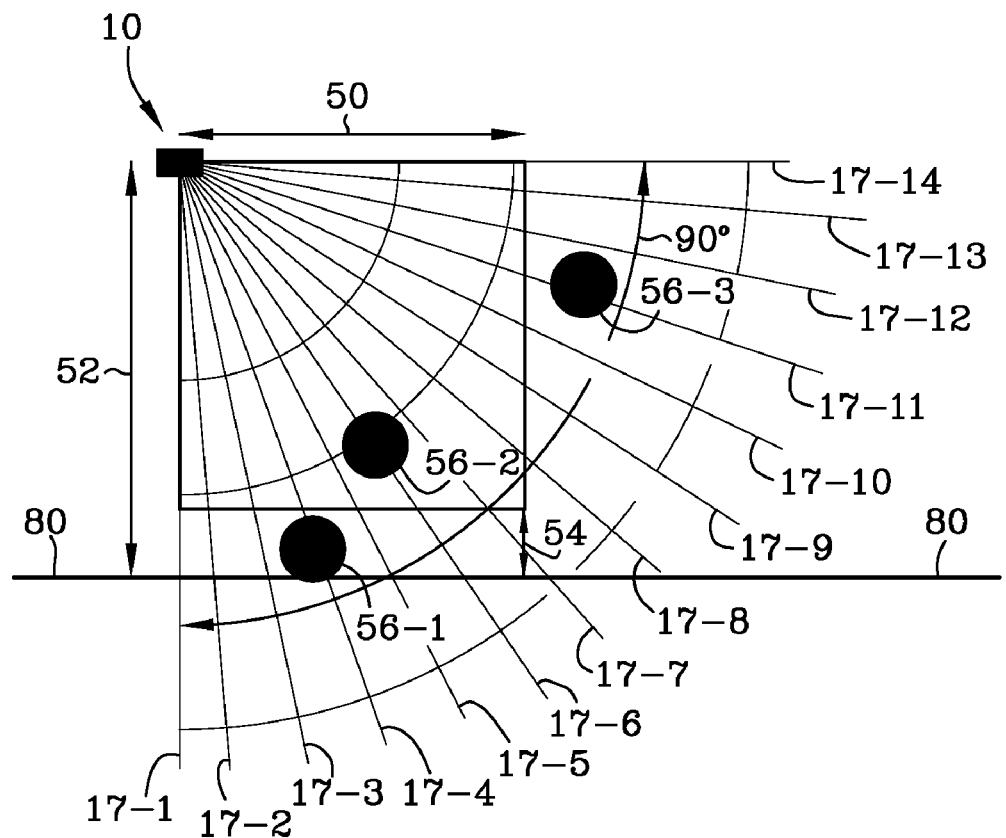
Figure 5:
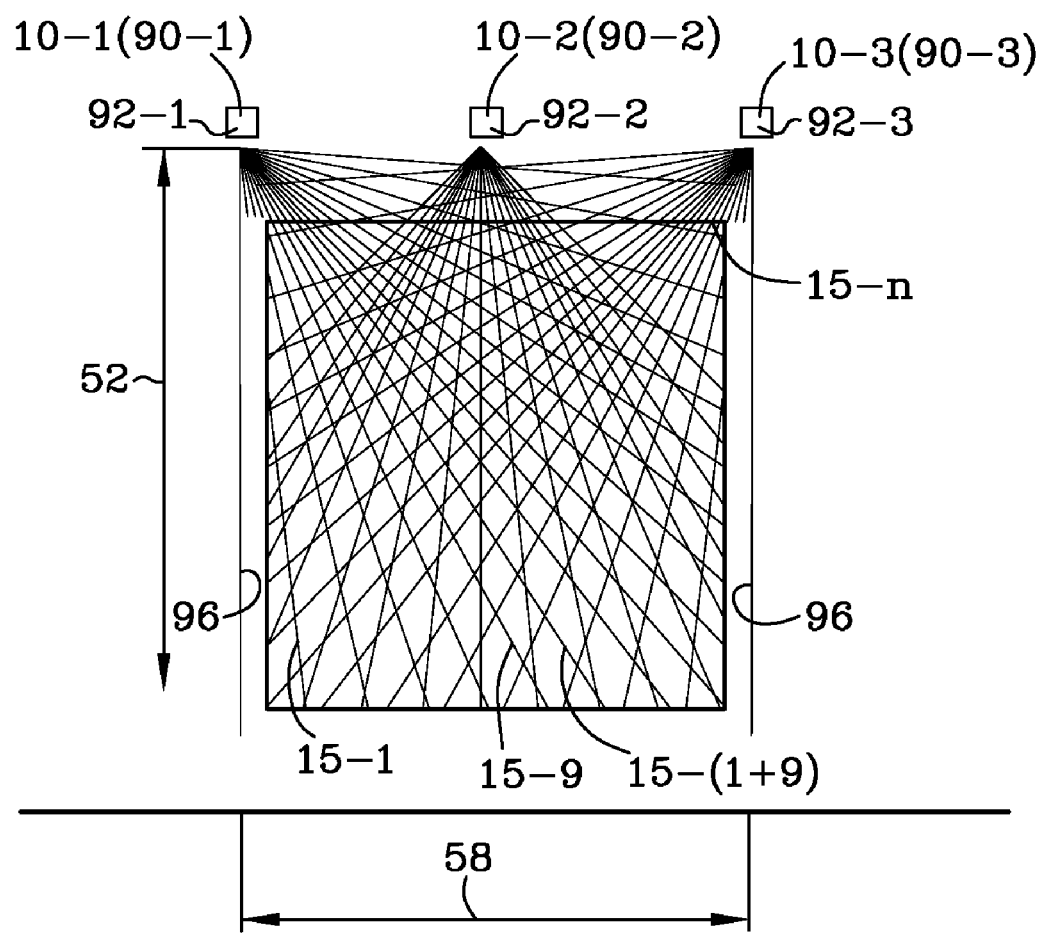
Figure 6:
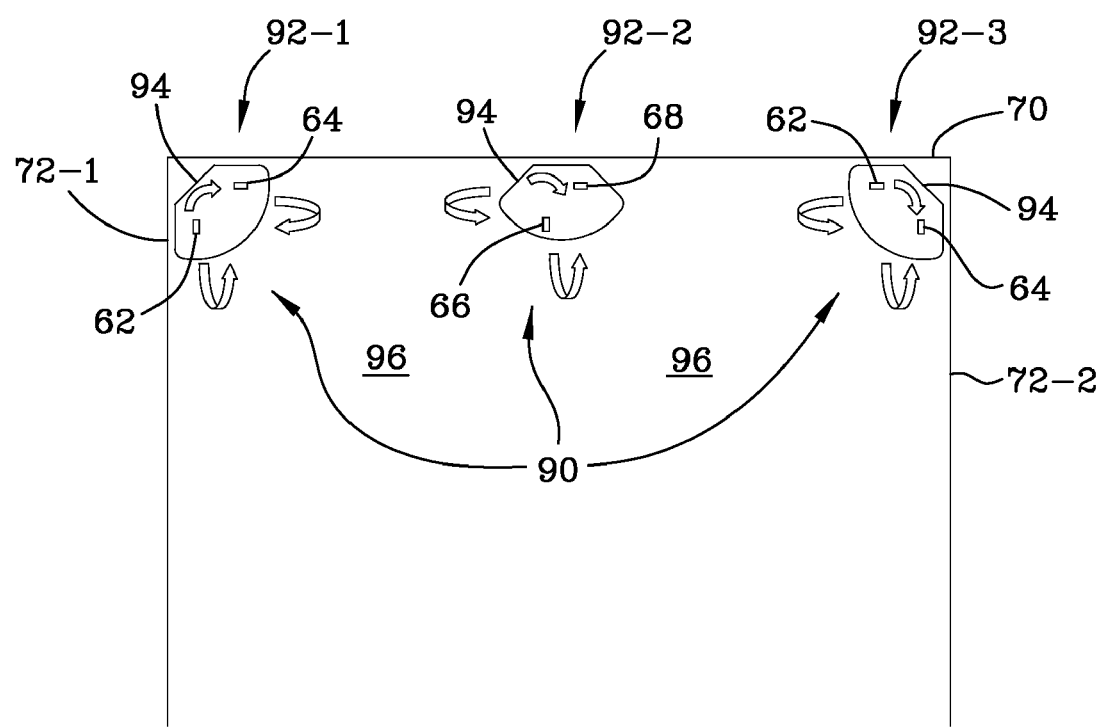
Figure 7A:
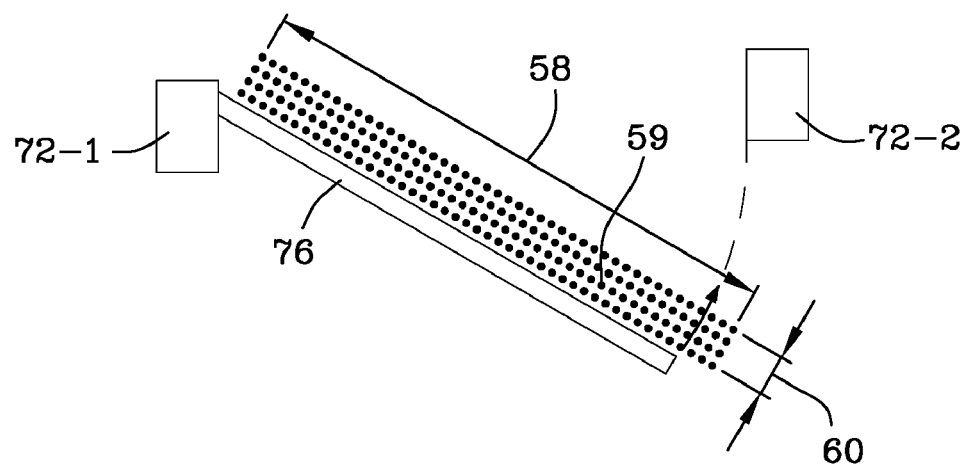
Figure 7B:
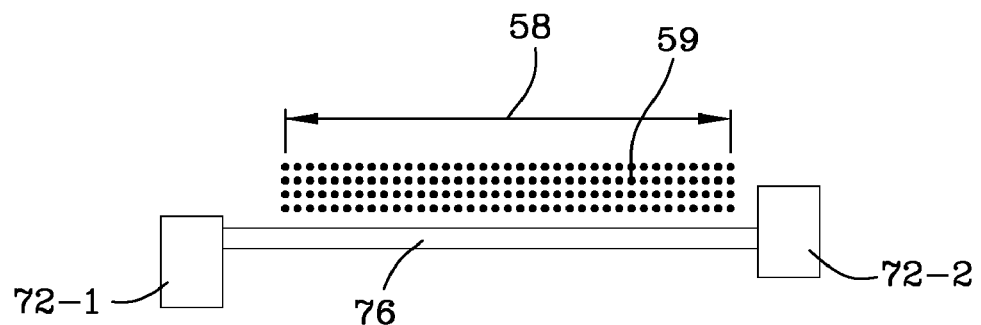
Figure 8:
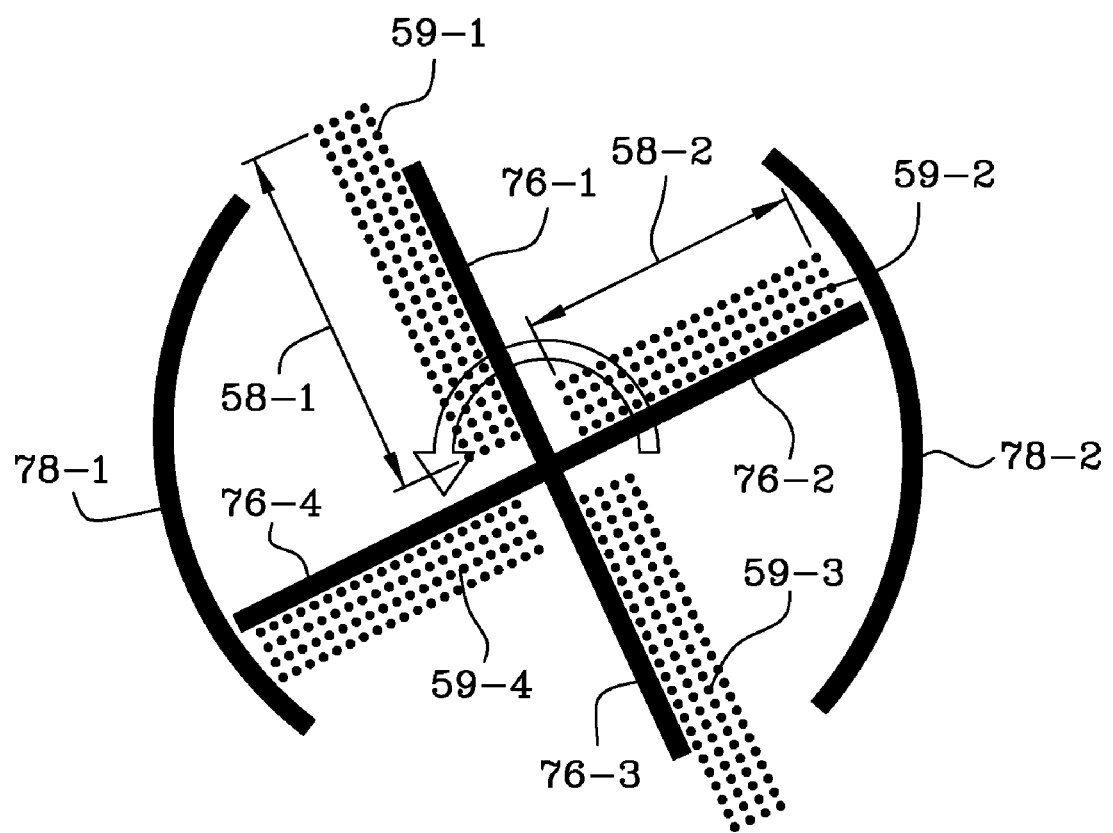

In the description, the appended claims, the abstract and in the drawings, use is made of the terms and corresponding reference numerals summarized in the list provided at the end of the description. In the drawings, is shown:

FIG. 1A a schematic top view on the laser scanner device according to a preferred embodiment of the invention when a rotating transmitter mirror means is in an orientation where a beam of light pulses transmitted by the pulse source is deflected;

FIG. 1B a schematic side view of the laser scanner device shown in FIG. 1A with the same orientation of the transmitter mirror means as in FIG. 1A;

FIG. 2A a schematic top view on the laser scanner device shown in FIG. 1A when the rotating transmitter mirror means is in an orientation where the transmitted beam of light pulses is not deflected;

FIG. 2B a schematic side view on the laser scanner device shown in FIG. 2A with the same orientation of the transmitter mirror means as in FIG. 2A;

FIG. 3 a schematic side view on another embodiment a light scanner device according to the invention applied as a door sensor system enabling with different tilt angles of the sweep sector;

FIG. 4 a schematic front view on a still further embodiment of a light scanner device according to the invention where the different measurement rays are located at different deflection angles along the sweep sector and where a detection range is limited and adjusted between subsequent deflection angle of the transmitted light beam;

FIG. 5 a schematic view illustrating different uses of an embodiment of a door sensor system according to the invention in a door application, where the door sensor system is provided notably in three different positions in a door opening and with three different sweep sectors;

FIG. 6 a schematic view illustrating another embodiment of a door sensor system according to the invention comprising a mounting bracket means and adjustment means, arranged in the three different positions, viz. a top left, a top centre and a top right position in a door frame;

FIG. 7A a schematic top view on a dynamically variable scanned area covered by an embodiment of the door sensor system according to the invention, where the scanned area extends along and projects beyond a door element of a swinging door when the door element is not between door frames;

FIG. 7B a schematic top view on a dynamically variable scanned area covered by the swinging door sensor of FIG. 7A, when the scanned area extends along and does not project beyond a door element of a swinging door when the swinging door element is between the door frames; and FIG. 8 a schematic top view on dynamically variable scanned areas covered in a still further embodiment of the door sensor according to the invention, where the scanned areas of the revolving door elements are dynamically varied depending on the position of the revolving door element with respect to the door frame.

A preferred embodiment of a light scanner device according to the invention and its functioning are described with reference to FIGS. 1A, 1B, 2A, 2B and 3.

As shown in FIGS. 1A, 1B, 2A and 2B, a light scanner device 10 comprises a pulse source 12 that emits a transmitted beam 14 of transmitted light pulses, a transmitter lens 16 that forms a substantially parallel transmitted beam 14 and a transmitter deflection means 20 that re-directs the transmitted beam 14 toward a surveillance area (not shown). The pulse source 12 is embodied as an infrared laser diode emitting short laser pulses at a wavelength in the region of infrared light of electromagnetic spectrum. A transmitter lens 16 is provided to form a parallel beam of transmitted pulses. The transmitter deflection means 20 is embodied as a rotating mirror element comprising four flat mirror facets 20-1, 20-2, 20-3 and 20-4, adapted to rotate around rotation axis 36 that extends substantially perpendicular to the main direction in which the pulse source 12 emits the transmitted laser pulses, i.e. substantially perpendicular to the transmitted beam 14.

The transmitter mirror element 20 is attached to and driven by a drive element 34 that is in turn coupled to, and driven by, a driving motor (not shown) having a controllable rotation speed. Transmitter mirror element 20 is driven to rotate in a direction indicated by an arrow in FIG. 1A, for example the clockwise direction when viewed from a top in FIG. 1A. As a result, the portion of the transmitted beam 14 that is reflected by a transmitted beam reflecting spot 26 on mirror facet 20-1, is swept in a sweep sector comprised in a sweep plane (which is the plane of the drawing of FIG. 1A) toward the surveillance area. Accordingly, in the surveillance area, the transmitted beam scans along a sweep line, along which the distance profile is to be measured. A portion of the transmitted laser light pulses is reflected back toward, and returns to, the light scanner device 10.

The light scanner device 10 further comprises a photodetector means 42, a receiver deflection means 24 that reflects a received beam 22 of light pulses returning from the surveillance area and re-directs the received light pulses of the received beam 22 toward the photodetector means 42. The light scanner device 10 further comprises a receiver lens 40 that focuses the received beam 22 onto a light-sensitive element of the photodetector means 42. The receiver deflection means 24 is embodied as a rotating mirror element comprising four flat mirror facets 24-1, 24-2, 24-3 and 24-4, and adapted to rotate around rotation axis 36 which is common to that of the transmitter mirror element 20. The receiver mirror element 24 is also attached to, and driven by, the drive element 34. As a result, the receiver mirror element 24 rotates synchronously with the transmitter mirror element 20.

The rotatable receiver mirror element 24 is arranged to be co-axially with the rotatable transmitter mirror element 20, whereby facets 24-1 to 24-4 of the receiver mirror element 24 are substantially parallel to facets 20-1 to 20-4 of the transmitter mirror element 20. As a result, the light pulses returning from the surveillance area reflected by a received beam reflecting spot 28 on the mirror facet 24-1 and re-directed toward the photodetector means 42 in the form of received beam 22.

On the trajectory between the respective rotating mirror elements 24 and 20 and the respective lenses 40 and 16, received beam 22 is substantially parallel to transmitted beam 14. This allows a compact and small construction of the light scanner device 10.

A casing 18 is provided that accommodates the pulse source 12 and the photodetector means 42. The casing 18 has two apertures adapted to receive respectively the transmitter lens 14 and the receiver lens 40. Along rotation axis 36, on drive 36, the transmitter mirror element 20 and the receiver mirror element 24 are axially spaced apart so that a gap or groove is present there between.

According to an aspect of the invention, the light scanner device further comprises an optical shielding means 32. In the embodiment of the light scanner device 10 shown in FIGS. 1 and 2, the optical shielding means 32 is embodied as a plate 32 that is arranged between the transmitter mirror element 20 and the receiver mirror element 24 and extends in the groove present there between. The shielding means further comprises a portion extending inside the casing 18, as indicated in FIGS. 1A and 2A by a dashed line. The optical shielding means (plate 32) extends from the transmitter and receiver mirror means 20 and 24 toward the surveillance area. For the purpose of avoiding "cross talking" of reflections, it is desirable that the shielding means extends a considerable distance away from the mirror means toward the surveillance area.

The optical shielding means 32 serves to shield the trajectory of transmitted light pulses from the trajectory of the received light pulses, so as to avoid that stray light that might be caused by any reflections on objects present along the trajectory of the transmitted pulses from the transmitted light enters into the space occupied by the trajectory of the received light pulses or even into the light sensitive portion of the photodetection means 42.

Objects present in the trajectory of the transmitted light pulses and able to cause stray light reflections may include, for example, dust and rain; rough portions of the surface of the mirror facets (e.g. facets 20-1 and 24-1) within the transmitted beam reflecting spot 26 and the received beam reflecting spot 28; rough portions or imperfections of a reflecting layer of reflector material provided on the mirror facets with the transmitted and received beam reflecting spots 26 and 28; or any imperfections, rough portions, dust or dirt on the surfaces of the transmitter and receiver lenses 16 and 40.

Various different embodiments for the assembly comprising the deflection mirrors and shielding means are conceivable.

Alternatively, to being embodied as two separate mirror elements axially spaced apart, the transmitter deflection means 20 and the receiver deflection means 24 could be integrated in a single rotating mirror element, where each multiple mirror facets extends along the rotational axis so as to provide sufficient space thereon for reflecting the transmitted beam 14 via the transmitted beam reflecting spot 26 and the returning beam of reflected light pulses via the received beam reflecting spot 28 distinctly without mutual overlap. Preferably, the transmitted beam reflecting spot 26 and the received beam reflecting spot 28 are spaced with respect to each other in a direction along the rotational axis, and a groove is provided on the facets of the mirror element so as to divide each facet in one portion comprising the transmitted beam reflecting spot and another portion comprising the received beam reflecting spot. The groove extends in a circumferential or tangential direction on each mirror facet and around the mirror element. An according optical shielding means is embodied as a plate having an aperture for receiving the rotating mirror element, such that the circumferential inner edge of the aperture extends into the groove separating the mirror facets.

Alternatively to the mirror means 20 and 24 comprising four facets, the transmitter deflection means 20 may be embodied as a rotatingly-driven multi-facet element comprising any number of facets. The number of facets of the transmitter deflection means may be for example between 1 and 8. The receiver mirror element may be embodied accordingly as a multi-facet mirror element comprising the same number of facets and being driven to rotate synchronously with the transmitter mirror element. The receiver mirror element could be arranged to have its own rotation axis arranged parallel to the rotation axis of the transmitter mirror element, or have a common rotation axis with the transmitter mirror element.

The above-described transmitter and receiver mirror elements could be made from metal or plastics, for example by a molding and/or injection technique, and then coated with a highly reflective coating.

Any embodiment is conceivable for the receiver deflection means as long as it enables to re-direct to the photodetector means the reflected light pulses returning from different directions according to the varying sweep angle imposed by the transmitter deflection means.

Alternatively, to rotating the transmitter mirror element to obtain the sweeping of the transmitted beam, it is possible to let the sweeping transmitter mirror oscillate so that the deflected transmitted beam of light pulses oscillates correspondingly across a sweep sector. Accordingly, the transmitter mirror element may comprise at least one facet arranged to oscillate, driven for example by a piezoelectric drive. For narrow deflection angles, the receiver mirror element could be embodied to be stationary, having for example a planar, an at least piecewise spherical or cylindrical reflecting surface that is arranged so as to reflect and redirect to the photodetector means the reflected light pulses returning from different directions according to the sweeping imposed by the transmitter mirror.

The optical shielding means is generally adapted so as to shield the space comprising the trajectory of transmitted light pulses from the space comprising the trajectory of the returning reflected light pulses throughout the extent of the light scanner device.

The light scanner device further comprises a central processing unit for processing the received light pulses, deriving the time of flight, averaging TOF measurements made at the same deflection angle over multiple sweeps in the same sweep plane, deducing the distance of the reflecting object, and optionally also determining the angular direction of the object with respect to the light scanner device based on the known beam deflection angle within the sweep sector respectively the sweep plane (described below with respect to FIG. 3) and the actual angle to the pulse-reflecting object in the sweep plane.

To this end, the photodetector means is fast enough to resolve individual light pulses and to produce an electrical pulse for each light pulse received. The photodetector is coupled, and outputs the electrical pulses, to a central processing unit. The central processing unit comprises, according to the needs, means to detect, average and threshold the electrical pulses received from the photodetector means; means to measure the time delay between the instant of transmission of a transmitted light pulse and the instant of receipt of the corresponding reflected light pulse; and means to establish a synchronization respectively a correlation between a transmitted light pulse and the corresponding received reflected light pulse.

The deflecting means, i.e. both the transmitter and the receiver deflection means, must be synchronized with the central processing unit, and to this end are provided with means for synchronizing the deflection means with the central processing unit adapted to provide the central processing unit with a reliable indication of the orientation or position of the deflection means. For example, the rotating or oscillating (transmitter and receiver) mirror means comprise a tab on at least one (or each) edge formed by at least one of the reflecting facets; the tab is adapted to repeatedly block and open a light trajectory of a light barrier means, for example a so-called optical fork.

While in the embodiments shown in FIGS. 1 and 2 and described above, the light scanner device sweeps the transmitted pulses across a single sweep sector in a single sweep plane substantially along a single sweep line, the device can be embodied such that the sweep plane is tilted in incremental steps of a tilt angle such that the transmitted pulses are swept subsequently along a plurality of different sweep lines in the surveillance area, respectively across a plurality of different sweep sectors in a plurality of different sweep planes as described in the following with reference to FIG. 3.

Alternative to the embodiment shown in FIGS. 1 and 2, where the mirror means 20 and 24 each comprise a plurality of, for example four, facets 20-1 to 20-4 and 24-1 to 24-4 that are substantially parallel to the rotation axis 36, the facets 20-1 to) 20-4 of the transmitter mirror element 20 can be arranged to be not exactly parallel to the rotation axis, but rather have small, mutually different angles with respect to the rotation axis 36. Thus, as shown in FIG. 3, when the transmitting mirror element 20 rotates around rotation axis 36 within the transmitted beam 14 such that the transmitted beam reflecting spot 26 moves across one facet and on across the next of the differently tilted facets, the transmitted beam 14 is deflected at different tilt angles to sweep sequentially through different sweep sectors in different sweeping planes 15 with different tilt angles. Accordingly, in a surveillance area for example on a ground 80 as in FIG. 3, the transmitted beam sweeps subsequently along different substantially parallel sweep lines (oriented perpendicular to the plane of drawing of FIG. 3), providing that a scanned area 59 has a width or scanning width 60. Each of the sweep sectors respectively sweeping planes 15 corresponds to a different tilt angle of a corresponding mirror facet.

Similar, the facets 24-1 to 24-4 of the receiver mirror element 24 are arranged at small, mutually different angles to be tilted relative to the rotation axis 36, so that the reflected light pulses returning from different sweep sectors in different sweep planes are sequentially re-directed by the mirror facets 24-1 to 24-4 of the rotating receiver mirror element 24 in a same direction toward the photodetector means 42.

In order to provide tilting of the sweep plane between subsequent sweeps, alternatively to having four facets as shown in the embodiments of FIGS. 1 to 3, the transmitter mirror means may be a multi-facet mirror element comprising any number of facets, for example between 1 and 8 facets, with different tilt angles so as to provide a corresponding number of sweep sectors in sweeping planes with different tilt angles.

Alternatively to providing a rotating transmitter mirror element with plural facets having different tilt angles, it is conceivable to provide a rotating first transmitter mirror element with plural facets that are substantially parallel to the rotation axis or to provide a first transmitter mirror element that can be oscillatingly moved or rotated to provide a sweeping deflection in a substantially fixed sweep plane, and to further provide a second mirror element that is arranged in the trajectory of the transmitted light pulses near the first transmitter mirror element to be pivotable or oscillatingly pivotable between discrete orientations, for example actuated by a piezoelectric drive, so as to deflect the beam swept by the first transmitter mirror element in discrete sweep planes with different tilt angles.

The light scanner device can further be adapted to limit a range of detect-ion and/or to modulate or change the range of detection according to each sweep, as illustrated in FIGS. 3 and 4. The term "range of detection" refers to the maximum distance at which an object may be detected. The detection zone corresponding to the rectangle of FIG. 4 could be adjusted independently for each of the sweep planes depicted in FIG. 3.

The range of detection can be arbitrarily limited by "closing" the electronic pulse detection chain after a certain time delay corresponding to the desired limited range of detection. Here, the expression "closing" the electronic pulse detection chain means that pulses arriving at the photodetector means while the electronic pulse detection chain is closed, are not taken into account. Such closing of the detection chain may be accomplished, for example, by electronic windowing techniques allowing to detect or transmit pulses when the detection chain is open and to filter out or suppress pulses when the detection chain is closed.

Within a single sweep, it is possible to set the limits of detection range for each TOF (Time Of Flight) measurement made inside the sweep. For each of these measurements, a maximum distance can be set by windowing technique to determine a given equivalent detection surface inside which any object will be detected when crossing the plane of detection. This corresponds to the rectangle depicted in FIG. 4.

Another application of a light scanner device, wherein the zone of detection is imposed to be limited (for example to a rectangle), and changed from one sweep to the subsequent sweep can generate a 3D volume of detection as is explained by way of example with respect to FIGS. 3 and 4. The light scanner device 10 generating the detection surface shown in FIG. 4 is adapted to change the tilt angle in incremental steps so as to provide a series of sweep sectors in a series of sweep planes 15-1 to 15-4 (to be represented on FIG. 3 and not FIG. 4) having different tilt angles. The light scanner device 10 is mounted at a predetermined device height 52 above the ground 80. For the different tilted sweep plane 15-1 to 15-4, the surface of detection is set independently. Within one sweep corresponding to a given tilt angle, the surface of detection (here a rectangle) is determined by adjusting the successive ranges of detection of subsequent measurement 17-1 to 17-*n* in order to follow the required surface. For the intermediate deflection angles, the detection range increases stepwise (from measurement angle 17-1 to measurement angle 17-7) to a maximum detection range and decreases (from measurement angle 17-8 to measurement angle 17-14), so that a portion of space is surveyed as indicated by the rectangle drawn with bold lines in FIG. 4, the rectangle having an edge length corresponding to the detection range 50 imposed for the vertical and horizontal deflection angle 17-1 and 17-14 The vertical corresponding to measurement 17-1 is smaller than the device mounting height 52, so that objects below an offset height 54 are outside of the detection range. In that way, a small object 56-1 positioned on the ground and having height less than the offset height 54 and an object 56-3 that is horizontally further away from the scanner device 10 than the detect-Lon range 52 are not detected. Only objects within the detection range, such as object 56-2, are detected by the light scanner device 10 with imposed limited detection range. Limiting the detection range as shown in FIG. 4 is a way to provide an offset height 54, below which objects are not detected, and to provide immunity to the light scanner device with respect to small objects lying on the ground.

For checking the long term stability and proper functioning of a light scanner device, and for the purpose of checking the accuracy of distance measurements, provision is made to calibrate the minimum detection distance as follows. The light scanner device further comprises calibration means comprising a reflector means 30. The reflector means 30 is arranged at a relatively short distance. As shown in FIGS. 1 and 2, the reflector means 30 is embodied as a retro-reflector, for example a so-called light pipe, that is adapted to reverse the travel direction of transmitted pulses and re-direct them toward the photodetector means. The retro-reflector 30 is positioned such that a portion of the transmitted beam reaches the retro-reflector 30 only for certain orientations of the rotating transmitter mirror means 20, such as the position shown in FIGS. 2A and 2B, where the facet 20-2 is tangent (parallel) to the transmitted beam 14. For other orientations of the transmitter mirror means 20, such as the position shown in FIGS. 1A and 1B, the transmitted beam is blocked and cannot reach the retro-reflector 30. As can best be seen in FIG. 2B, the retro-reflector 30 is arranged such that retro-reflected pulses travel toward and reach the photodetector means 42. Preferably, the measurement of the non-varying distance Time of Flight between the transmitter, the retro-reflector and the receiver needs to stay invariant. Any variation is due to electronic drift. It is then measured for this known distance and used to compensate the actual distance measurements made along the measurement sweep.

In the embodiment shown in FIGS. 1 and 2, detecting light pulses that have been reflected from the reflector means can not only be used to calibrate the distance measurements, but also to synchronize the transmission of pulses toward the surveillance area with the central processing unit. Such double use of the reflecting means 30 for both calibrating and synchronization is achieved whenever the trajectory of the transmitted and received light is arranged such that a portion of the transmitted beam is sent back to the receiver through the retro reflector.

In the preferred embodiment shown in FIGS. 1 and 2, this is obtained because the edges of the mirror facet 20-1, 20-2 repeatedly open respectively block the path toward the reflector means 30, when the transmitter mirror element 20 rotates.

FIG. 5 illustrates an application, for example in relation to the surveillance of a door opening, where a light scanner devices 10-1, 10-2, 10-3 is used as door sensor systems 90-1, 90-2, 90-3 and installed on three different positions. The door sensor systems 90-1, 90-2 and 90-3 are respectively mounted at three different locations, viz. a top left position 92-1, top center position 92-2 and top right position 92-3 with respect to and above the door opening 96.

The minimum detection distances and the maximum detection distances (detection ranges) of the door sensor systems 90-1 to 90-3 are adjusted such that door sensor systems jointly survey a portion of the door opening 96 as indicated by the bold rectangle indicated in FIG. 5.

As stated above, the light pulses can be of wavelengths in the range of non-visible infrared light. However, the wavelength of the light of the transmitted pulses is not limited to the infrared range and can be any wavelength in the far infrared, infrared, near infrared and visible range.

For a commercial application of the light scanner device such as an application as a door sensor, it is desirable that the sensible elements of the light scanner device including the pulse source, the photodetector means and the deflection means are accommodated in a casing that provides protection against influences from the environment such as rain, dust and dirt.

For a commercial application it is further desirable that the surveillance area can be easily adjusted and that the light scanner device can be conveniently mounted to a mounting surface preferably in a selectable mounting orientation.

Easy adjusting of the surveillance area is achieved by using a pulse source transmitting light pulses having wavelengths in the visible range of the electromagnetic spectrum, so that (objects in) the scanned area is visibly illuminated by the transmitted light. When the sensor device is intended to function non-suspiciously, whereby the light used for the TOF measurement shall not be visible, and is thus selected to be for example in the far to near infrared range, a supplementary illumination means can be provided that emits visible light and that is adapted to visibly illuminate the scanned area. The illumination means can preferably be switched on and off or dimmed to emit a variable level of illumination light intensity.

Convenient mounting to a mounting surface is achieved by providing mounting bracket means to enable convenient mounting of the light scanner device in different orientations as shown for example in FIG. 6. The bracket 94 may be a portion of the casing. Preferably, the bracket 94 comprises different flat portions in different planes so as to allow in different orientations stable contact on a flat mounting surface, onto which the device is to be mounted.

In the example shown in FIG. 6, the bracket 94 has three flat portions that are oriented at angles of substantially 45° with respect to each other. This allows the light scanner device to be mounted in three different orientations on a flat mounting surface. When the light scanner device is used as a door sensor system 90 as in the example of FIG. 6, it can conveniently be mounted in at least three different locations 92-1, 92-2, 92-3 of a door frame in corresponding different orientations regarding the tilt angle of the sweep sector. The door sensor system 90 with such bracket 94 can be mounted notably in a top left corner (mounting position 92-1) formed at the joint of a first (left) door side frame element 72-1 and a door top frame element 70 in a first tilted orientation so as to "look" downward at a tilted angle substantially toward a centre of the door opening 96, or at a centre mounting position 92-2 of the door top frame element 70 in a third orientation so as to "look" substantially vertically downward toward the centre of the door opening 96, or in a top right corner (mounting position 92-1) formed at the joint of a second door side frame element 72-2 opposite to the first door side frame element 72-1 and the door top frame element 70 in a second tilted orientation so as to "look" downward at a tilted angle substantially toward the centre of the door opening 96, symmetrically in the door opening 96 to the first mounting position 92-1 providing the first tilted orientation.

The door sensor system 90 can further be mounted at a left side mounting position (not shown) on the first door side frame element 72-1, preferably at about half of the height of the door top frame element 70 above the ground to provide a fourth tilted orientation so as to "look" substantially horizontally toward the centre of the door opening 96, and symmetrically in the door frame 96 at a right side mounting position (not shown) on the second (right) door side frame element 72-2 to provide a fifth tilted orientation so as to "look" substantially horizontally toward the centre of the door opening 96 in a substantially opposite direction relative to the fourth tilted orientation.

The door sensor system shown in FIG. 6 further comprises adjustment means for adjusting the orientation of the door sensor device such that a position of the scanned area can be aligned with respect to the door elements (76; 76-1, 76-2, 76-3, 76-4). The adjustment means may be embodied as screws (62, 64, 66, 68) adapted to adjust the tilt angle of the sweep sector.

In door sensor applications, alternatively and/or additionally to being mounted to a stationary door frame element, the door sensor system could be mounted on a moving door element, for example a swinging or sliding door element that is adapted to close and open the door opening 96, or on a revolving door element.

Further to enabling dynamically varying between subsequent sweeps the tilt angle of the sweep plane, allowing to adjust a scanning width 60 of a scanned area 59 as explained with respect to FIG. 3, in a further embodiment of the light scanner device, an opening angle of the sweep sector in the sweep plane can be dynamically varied so that a scanning length 58 of the scanned area 59 changes accordingly, as illustrated by way of example in FIGS. 7A and 7B, where the light scanner device is used as a door sensor system 90. It is mounted at a substantially top centre mounting position on a swinging door element 76 and oriented such that the sweep sector respectively the sweep plane is tilted in a substantially downward direction toward the scanned area 59 on a ground. The door sensor is adjusted such that the sweep sector respectively the sweep planes are substantially parallel to the door element 76. The dashed lines in FIGS. 7A and 7B indicate the sweep lines projected by the light scanner device respectively the door sensor system on the ground. The scanned area 59 has a scanning width 60 that is determined by the number of different tilt angles (four as in the example of FIG. 3) and the incremental tilt angle between adjacent sweep planes in combination with the distance of the scanned area 59 from the sensor system, i.e. the mounting height of the sensor system above the ground in the example application illustrated in FIG. 7. The opening angle of the sweep sectors in the sweep planes can be dynamically varied, so that a scanning length 58 of the scanned area 59 is varied accordingly, depending on the posit-Lon of the moving door element 76.

As shown in FIG. 7A, when the door element is positioned such that it is not between the first and second door side frame elements 72-1 and 72-2, the scanning length 58 of the scanned area 59 extends substantially along and further projects beyond the door element 76. The projecting portion increases the scanned area 59 and creates a guard distance, which contributes to increase safety by enabling detecting objects and persons within the guard distance in the vicinity of the area covered by the trajectory of movement of the swinging door element 76 from being hurt by the moving door element 76. When the door is almost or fully closed, i.e. when the door element is positioned substantially between the first and second door side frame elements 72-1 and 72-2, the scanning length 58 of the scanned area 59 extends substantially only along the door element 76, without projecting there beyond so as to avoid interference with the door side element 72-2.

FIG. 8 illustrates an application of a door sensor system 90 to a revolving door. The revolving door comprises a first revolving door frame element 78-1 (on the left side in FIG. 8) and a second revolving door frame element 78-2 (on the right side in FIG. 8), and four revolving door elements or door leaves 76-1 to 76-4 arranged substantially orthogonal to each other and adapted to revolve (for example in the counter-clockwise direction when viewed from the top, as indicated by the arrow in FIG. 8) around a vertical axis extending along a joint of the four door leaves 76-1 to 76-4. The door sensor system 90 further comprises one light scanner device associated with each revolving door element (76-1 to 76-4). Each light scanner device is mounted near a top edge of the associated revolving door element and is oriented such that the sweep sectors are parallel to the door elements and extend approximately vertically downward. Accordingly, sweep areas 59-1 to 59-4 are provided on the ground respectively near the feet of, and in parallel arrangement to, the revolving door elements 76-1 to 76-4. Preferably, the light scanner devices are arranged such that the respective sweep sectors and scanned areas 59-1 to 59-4 are in front of the revolving door elements 76-1 to 76-4 with respect to the rotational direction of movement of the revolving door elements. Enabled by the capability to dynamically vary the opening angle of the sweep sector in the sweep plane, respectively the scanning length of the scanned area, in the example shown in FIG. 8, the door sensor system is adapted such that the scanning length of the scanned area associated with a door leave, of which the radically outer edge is between the door frames 78-1 and 78-2, extends along and does not project beyond the associated revolving door element, see for example the scanning length 58-2 of the scanned area 59-2 associated with the revolving door element 76-2 and the scanning length 58-4 of the scanned area 59-4 associated with the revolving door element 76-4. Further in the situation illustrated in FIG. 8, the scanning length of the scanned area associated with a door leave, of which the radically outer edge is outside of the door frame, i.e. a door leave that is not between the door frame element 78-1 and 78-2, not only extends along but also projects radically beyond the associated revolving door element, see for example the scanning length 58-1 of the scanned area 59-1 associated with the revolving door element 76-1 and the scanning length 58-3 of the scanned area 59-3 associated with the revolving door element 76-3.

In summary, a door sensor system based on light scanner devices according to the invention can be adjusted such that it varies its scanned area or detection field to constantly optimize the protection of the edge of the door element or elements, so as to create a guard area projecting beyond the extensions of the door element or elements, thus increasing the safety of persons in the guard area near the door element edge by preventing them from being hurt by the moving door element.

It is understood that the embodiments described above can be combined and any feature disclosed with respect to one embodiment may also be applied in another embodiment.

| REFERENCE NUMERALS LIST | |
|---|---|
| 10 | laser scanner device |
| 12 | pulse source |
| 14 | transmitted beam |
| 15 | sweep plane |
| 15-1, 15-4 | sweep plane at different tilt angles. |
| 16 | transmitter lens |
| 17 | distance measurements along a sweep. |
| 17-1, 17-n | distance measurements at different deflection angles. |
| 18 | casing |
| 20 | transmitter mirror means |
| 20-1 | first emitter mirror facet |
| 20-2 | second emitter mirror facet |
| 20-3 | third emitter mirror facet |
| 20-4 | fourth emitter mirror facet |
| 22 | received beam |
| 24 | receiver mirror means |
| 24-1 | first receiver mirror facet |
| 24-2 | second receiver mirror facet |
| 24-3 | third receiver mirror facet |
| 24-4 | fourth receiver mirror facet |
| 26 | transmitted beam reflecting spot |
| 28 | received beam reflecting spot |
| 30 | reflector means/light pipe |
| 32 | shielding means |
| 34 | drive element |
| 36 | rotation axis |
| 40 | receiver lens |
| 42 | photodetection means |
| 50 | detection range |
| 52 | device height |
| 54 | offset height |
| 56 | target object |
| 56-1, 56-2, 56-3 | target object at different positions |
| 58 | scanning length |
| 59 | scanned area |
| 60 | scanning width |
| 62 | first adjusting means |
| 64 | second adjusting means |
| 66 | third adjusting means |
| 68 | fourth adjusting means |
| 70 | door top frame element |
| 72 | door side frame element |
| 76 | moving door element |
| 76-1, 76-2, 76-3, 76-4 | revolving door element |
| 78 | revolving door frame element |
| 80 | ground |
| 90 | door sensor device |
| 92-1, 92-2, 92-3 | different positions of door sensor device |
| 94 | mounting bracket means, bracket |
| 96 | door opening |

The invention claimed is

1. A door sensor system (90) for detecting a target object (56) in and/or near a door, comprising:
a door opening (96),
at least one movable door element (76-1, 76-2, 76-3, 76-4),
at least one light scanner device (10),
each said light scanner device includes moving mirrors,
each said light scanner device mounted at a given mounting angle with respect to said door element,
said moving mirrors of said light scanner device deflecting light generated by said light scanner device, each said mirror includes a plurality of mirror facets and each said facet oriented at a tilt angle with respect to an axis (36) of said moving mirrors, said tilt angles of said plurality of mirror facets defining a plurality of tilted detection planes (scanning planes) generated by said moving mirrors,
each detection plane, scanning plane, includes a sweep sector
a scan angle defined by said plurality of detection planes, scanning planes, said scan angle includes a scanning width (60) and a scanning area (59), and,
said light scanner device optically measures the distance to a target at regular intervals 15-$i$) within the sweep sector of each scanning plane (15) covering the scanning area (59).

2. The door sensor system according to claim 1 comprising a light scanner device for measuring a range and an angular direction of said target object (56), said device (10) comprising:
a pulse source (12) adapted to transmit light pulses,
a transmitter deflection means 20) adapted to sweep the transmitted light pulses in variable sweep directions across a sweep sector,
a photo detection means (42) adapted to detect received light pulses that have been reflected in said sweep sector,
a receiver deflection means (24) adapted to re-direct light pulses that have been reflected in the sweep plane (15) to said photo detection means (42),
further comprising optical shielding means (32) adapted to optically shield transmitted light pulses on their trajectory from said pulse source (12) to said transmitter deflection means (20) and at least a portion of their trajectory extending from said transmitter deflection means (20) into said sweep sector from reflected light pulses on their trajectory between said photo detection means (42) and said receiver deflection means (24) and at least a portion of their trajectory extending in said sweep sector and ending on said receiver deflection means (24), wherein said transmitter deflection means (20) and said receiver deflection means (24) both comprises a multi-facet mirror comprising a plurality of at least one facet that is/are substantially parallel to each other, and wherein the multi-facet mirror of the transmitter deflection means (20) and the multi-facet mirror of said receiver deflection means (24) are adapted to be rotated in synchronism with each other on a common rotation axis (38),
wherein the multi-facet mirror of the transmitter deflection means (20) and the multi-facet mirror of said receiver deflection means (24) form a split multi-facet mirror comprising a groove adapted to optically separate the multi-facet mirror of the transmitter deflection means (20) and the multi-facet mirror of the receiver deflection means (24).

3. The door sensor system according to claim 1 wherein said scanned area is adjustable, and, said tilted detection planes, scanning planes, are oriented as desired, between a substantially vertical orientation and a substantially horizontal orientation near a door opening and door elements and at a predetermined height above or on the ground (80).

4. The door sensor system according to claim 1 wherein said light scanner device has an adjustable scanning area and the width (50) and height (52 minus 54) of said scanning area is variable according to the dimensions of said door.

5. he door sensor system according to claim 1 wherein said at least one light scanner device (10) is associated with said door opening (96) to survey the whole surface of said door opening.

6. The door sensor system according to claim 1 for a door with movable elements wherein at least one light scanner device (10) is associated with each said movable door elements (76-1, 76-2, 76-3, 76-4).

7. The door sensor system according to claim 5 wherein at least one light scanner device (10) is associated with each movable door element (76-1, 76-2, 76-3, 76-4).

8. The door sensor system according to claim 1 wherein said light scanner device forms a scanned area (59), said scanned area (59) has a scanning length (58) that is directed substantially parallel to said movable door element (76-1, 76-2, 76-3, 76-4).

9. The door sensor system according to claim 7 wherein:
said scanner device forms a scanned area 59), said scanned area has a scanning length (58),
said scanning length (58) can be dynamically varied to extend along and not project beyond said movable door element (76-1, 76-2, 76-3, 76-4) when said movable door element is between door frame elements (72, 78), and,
said scanning length (58) projects beyond said movable door element when said movable door element is not between said door frame elements.

10. The door sensor system according to claim 1 wherein said light scanner device transmits and receives non-visible light pulses and said door sensor system further comprises an illumination means adapted to emit visible light so as to visibly illuminate a scanned area (59).

11. The door sensor system according to claim 1 further comprising adjustment means for adjusting the orientation of the door sensor device such that a position of a scanned area can be aligned with respect to door elements (76-1, 76-2, 76-3, 76-4).

12. The door sensor system according to claim 11 wherein said adjustment means comprises a screw (62, 64, 66, 68) adapted to adjust said tilt angle of said sweep sector.

13. The door sensor system according to claim 12 comprising a mounting bracket means (94) adapted such that said system can be mounted to a door frame element (70, 72, 78) in at least three different angular positions (92-1, 92-2, 92-3) corresponding with at least three different tilt angles generating three different sweep sectors.

14. The door sensor system according to claim 3 wherein said light scanner device has an adjustable scanning area and the width (50) and height (52 minus 54) of the scanning area can be adjusted according to the dimensions of said door.

15. The door sensor system according to claim 14 wherein said at least one light scanner device (10) is associated with said door opening (96) to survey the whole surface of said door opening.

16. The door sensor system according to claim 15 wherein at least one light scanner device (10) is associated with each movable door element (76; 76-1, 76-2, 76-3, 76-4).

17. The door sensor system according to claim 4 wherein said light scanner device transmits and receives non-visible light pulses, and said door sensor system further comprises an illumination means adapted to emit visible light so as to visibly illuminate scanned area (59).

18. The door sensor system according to claim 17 wherein said adjustment means comprises a screw (62, 64, 66, 68) adapted to adjust the tilt angle of the sweep sector.

* * * * *

UNITED STATES PATENT AND TRADEMARK OFFICE
CERTIFICATE OF CORRECTION

PATENT NO. : 7,446,862 B2  Page 1 of 1
APPLICATION NO. : 11/834646
DATED : November 4, 2008
INVENTOR(S) : Zambon It is certified that error appears in the above-identified patent and that said Letters Patent is hereby corrected as shown below:

Column 16, line 5, after "intervals" insert -- (--.

Column 16, line 13, after "means" insert -- ( --.

Column 16, line 57, after "5." delete "he" and insert -- The --.

Column 17, line 7, after "area" insert -- ( --.

Column 11, line 17, after "the" delete "detect-Lon" and insert -- detection --.

Column 13, line 57, after "the" delete "posit-Lon" and insert -- position --.

Column 14, line 38, after "the" delete "radically" and insert -- radially --.

Column 14, line 47, after "the" delete "radically" and insert -- radially --.

Column 14, line 50, after "projects" delete "radically" and insert -- radially --.

Signed and Sealed this

Twenty-third Day of December, 2008

JON W. DUDAS
*Director of the United States Patent and Trademark Office*